United States Patent Office 3,242,329
Patented Mar. 22, 1966

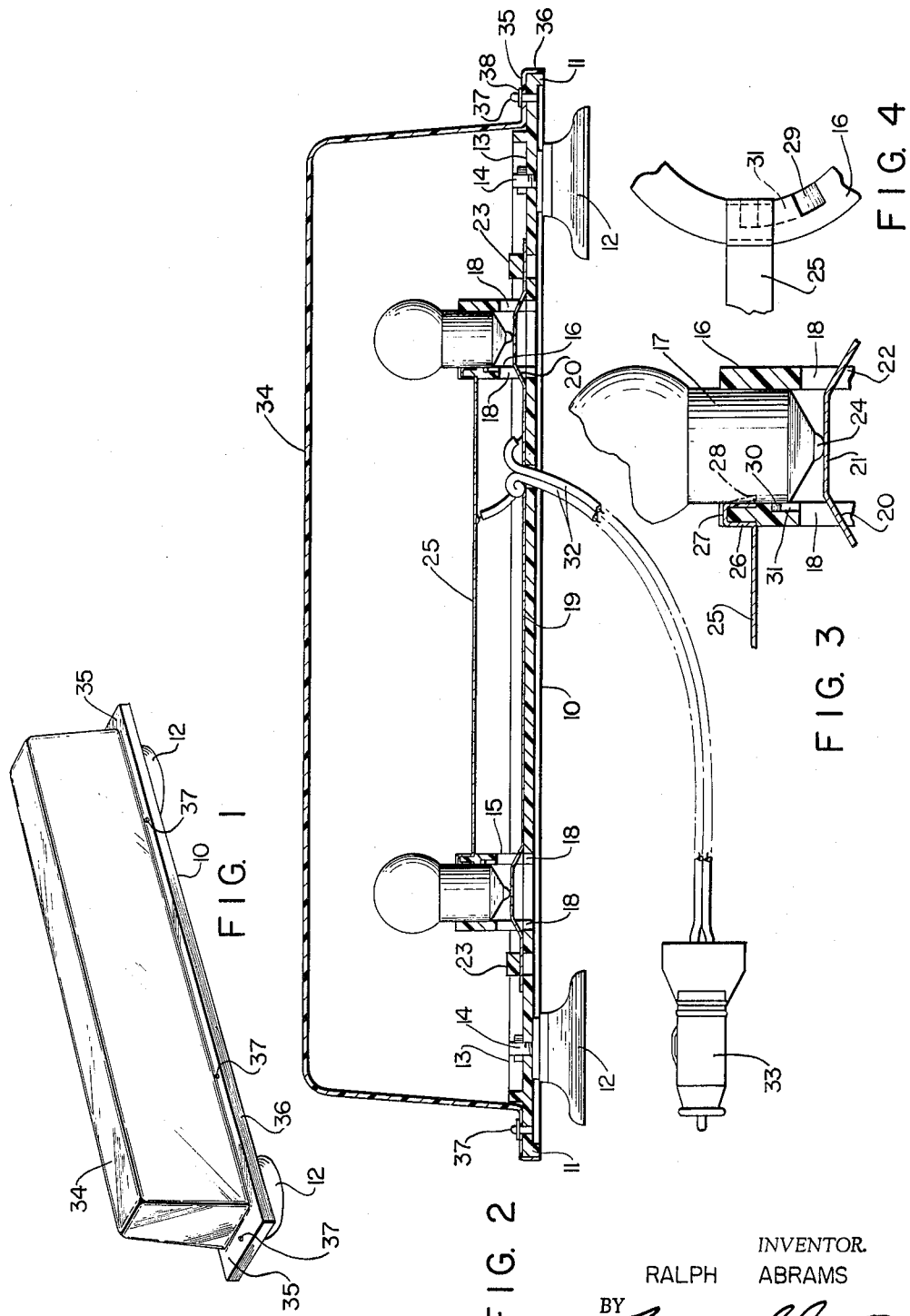

3,242,329
ILLUMINATED VEHICLE DISPLAY DEVICE
Ralph Abrams, Warwick, R.I., assignor to Cable Electric Products, Inc., Providence, R.I., a corporation of Rhode Island
Filed Feb. 4, 1964, Ser. No. 342,359
5 Claims. (Cl. 240—7.1)

My present invention relates to display devices and more particularly to an illuminated display device for the top of a motor vehicle.

The principal object of the present invention is to provide an illuminated display device which can be removably mounted on the top of a motor vehicle.

Another object of the present invention is to provide an illuminated display device for a motor vehicle which is of simple and light construction, most of the parts being molded of plastic material.

A further object of the present invention is to provide an illuminated display device for a motor vehicle which is made of a minimum number of parts which can be rapidly and easily assembled, thus greatly reducing the cost of manufacture.

Another object of the present invention is to provide an illuminated display device for a motor vehicle which can be rapidly mounted or dismounted from the vehicle.

With the above and other objects and advantageous features in view of my invention consists of a novel arrangement of parts more fully disclosed in the detailed description following in conjunction with the accompanying drawings and more particularly defined in the appended claims.

In the drawings,

FIG. 1 is a perspective view of a device embodying my present invention.

FIG. 2 is a longitudinal section of the device.

FIG. 3 is an enlarged detailed view of the right hand socket assembly shown in FIG. 2.

FIG. 4 is a fragmentary enlarged top plan view of the right hand socket construction.

Police, fire and taxi vehicles are often equipped with permanent types of illuminated display devices. However, such display devices and others containing advertising matter are occasionally placed on top of vehicles on a temporary basis so that they can be removed when the vehicle is being used for private purposes. The present invention pertains to such an illuminated display device which is of extreme simple construction made of light material, and designed for easy and rapid assembly and mounting.

Referring more in detail to the drawings, the device comprises an elongated rectangular base 10 which can be molded or otherwise formed from a plastic material. The base 10 is preferably formed with a flange 11 extending around the perimeter thereof. Adjacent each end of the base 10 is a large conventional suction cup 12 mounted beneath the base 10 for attaching the display device to the top of a vehicle and for quick removal thereof. The suction cup may be attached to the base 10 as by the threaded shaft 13 extending through the base and held in place by a nut 14. Illumination is provided by a pair of small electric lamps adapted to be operated by the vehicle battery and mounted as hereinafter described.

Referring to FIGS. 2, 3 and 4, the base 10 is provided with a pair of spaced integrally molded socket portions 15 and 16 extending integrally vertically from the base as shown in FIG. 2. Each socket portion is of annular shape and designed to receive a motor vehicle lamp base 17 having a bayonet connection. Each socket 15 and 16 is formed with aligned vertical slots 18 extending upwardly from the lower portion of each socket adjacent the base 10 and upwardly therefrom to a point slightly above the surface of the base 10. It is contemplated that the lamps be connected in parallel. Therefore the device is equipped with a pair of contact elements designed for quick assembly. The lower contact element comprises a strip of spring brass stock 19 approximately ⅛″ wide. The strip 19 extends along the surface of the base 10 as shown in FIG. 2 between the sockets 15 and 16. At each socket 15 and 16 the strip 19 is bent at an angle upwardly at 20 through the socket slots 18 then horizontally at 21 across the bottom of the socket as illustrated in FIGS. 2 and 3, and downwardly again at 22 back to the surface of the base 10. Each end of the strip 19 is then fastened beneath a lug 23 integrally molded with the base 10. The strip 19 is rapidly inserted through the slots 18 and is positioned in the path of downward movement of the bases 17 of the lamps so that the lower contact element 24 of each lamp base contacts the horizontal portion 21 of the strip 19 as illustrated in FIGS. 2 and 3.

The second contact element also comprises a comparatively stiff brass strip approximately ¼″ wide 25 extending in spaced vertical relationship to the strip 19 between the two sockets 15 and 16 as shown in FIGS. 2 and 3. Each end of the strip 25 is provided with an inverted U-shaped bend formed by sharply bending the end of the strip upwardly at 26 horizontally at 27 and then downwardly vertically at 28. However the downward vertical leg 28 is actually positioned at a slight outward angle as shown in dotted lines in FIG. 3. This forms a spring arm for a purpose hereinafter to be described. Each socket portion 15 and 16 is provided with a cut out slot for receiving the U-shaped portions 26, 27 and 28 in a tight fit as shown in FIG. 3. In assembly it is merely necessary to stretch the strip 25 between the sockets 15 and 16 as shown in FIG. 2 and press the U-shaped portions downwardly over the edge of the sockets as shown in FIG. 3. As each lamp base 17 is inserted in its socket as shown in FIG. 3, it will move the spring arm portion 28 inwardly out of the way while it moves downwardly into contact with the strip 19. The arm 28 will continue to press outwardly against the side of the lamp base 17 to form the electrical contact.

To form the locking bayonet connection with the lamp base 17, each socket 15 and 16 is provided with a vertical slot portion 29 as shown in FIG. 4 which permits the bayonet pin 30 on the lamp base to be moved vertically downwardly. At its lowermost position it is turned laterally into a slot 31 to lock the lamp into the socket.

Completing the assembly an electrical cord lead connection 32 is connected to the strips 19 and 25 as shown in FIG. 2 and is made long enough so that at its outer end a connecting plug 33 may be inserted into the cigarette lighter outlet at the dashboard for providing electrical current for the display device. The device is light and simple and easy to manufacture and assemble. The electrical strips can be positioned very rapidly into their respective places and no complicated wiring need be made. The entire display construction is now covered by a housing member 34 made of translucent plastic material and carrying the advertising matter or insignia required. The member 34 is also designed to cover the base to protect the inside from weather, rain, etc. To do this the member 34 is provided with a flange 35 extending to the edge of the base and then downwardly extending portion 36 extending around the perimeter. Since the entire member 34 is molded in a single integral piece, it acts as a cover for the base completely protecting it from the weather. To hold it in place the base is provided adjacent its perimeter with a plurality of pins 37 which may be snap pins so that the portion 34 is provided with suitable openings along its flange 35 which snap over the pins 37 and may be further held in place by washers 38 if desired.

I have thus provided an illuminated display device for the top of a motor vehicle which is quite simple in construction the basic parts being molded in a single integral piece, which requires very little assembly, the strips 19 and 25 being very rapidly and easily positioned in place, and also which can be very readily positioned at the top of the vehicle by means of the suction cups 12 and plugged into the cigarette lighter for rapid connection.

While I have described the invention as applied to a motor vehicle, it is obvious that it can readily be applied to any other type of vehicle or boat, or can be mounted in a fixed position utilizing a standard 110 v. current. Other advantages of the present invention will be readily apparent to a person skilled in the art.

I claim:

1. An illuminated display device for a motor vehicle comprising a rectangular base, means for mounting said base on a motor vehicle, spaced sockets on said base for receiving electrical bulbs, a pair of spaced conductor strips of stiff metal extending between said sockets to connect said sockets in electrical parallel, an electrical cord connection to said strips, and a translucent cover over said base, one of said strips extending between said sockets in spaced relation to said base, each end of said strip being bent into an inverted U-shape and extending over the edge of the adjacent socket whereby the free end of said strip makes electrical contact with the side of the bulb base mounted in each socket.

2. An illuminated display device for a motor vehicle comprising a rectangular base, means for mounting said base on a motor vehicle, spaced sockets on said base for receiving electrical bulbs, a pair of spaced conductor strips of stiff metal extending between said sockets to connect said sockets in electrical parallel, an electrical cord connection to said strips, and a translucent cover over said base, one of said strips extending along said base to said sockets, said sockets having aligned slots, said strip extending through said slots whereby contact is made with the bottom end of the bulb base mounted in each socket, the other of said strips extending between said sockets in spaced relation to said base, each end of said other strip being bent into an inverted U-shape and extending over the edge of the adjacent socket whereby the free ends of said other strip make electrical contact with the side of the bulb base mounted in each socket.

3. An illuminated display device for a motor vehicle comprising a rectangular base, means for mounting said base on a motor vehicle, spaced sockets on said base for receiving electrical bulbs, a pair of spaced conductor strips of stiff metal extending between said sockets to connect said sockets in electrical parallel, an electrical cord connection to said strips, and a translucent cover over said base, said sockets being molded integrally with said base, said base mounting comprising a pair of suction cups for removably mounting on the roof of a motor vehicle, said cord lead wire having a plug for electrical contact in the cigarette lighter socket of the vehicle, one of said strips extending between said sockets in spaced relation to said base, each end of said strip being bent into an inverted U-shape and extending over the edge of the adjacent socket whereby the free end of said strip makes electrical contact with the side of the bulb base mounted in each socket.

4. An illuminated display device for a motor vehicle comprising a rectangular base, means for mounting said base on a motor vehicle, spaced sockets on said base for receiving electrical bulbs, a pair of spaced conductor strips of stiff metal extending between said sockets to connect said sockets in electrical parallel, an electrical cord connection to said strips, and a translucent cover over said base, said sockets being molded integrally with said base, said base mounting comprising a pair of suction cups for removably mounting on the roof of a motor vehicle, said cord lead wire having a plug for electrical contact in the cigarette lighter socket of the vehicle, one of said strips extending along said base to said sockets, said sockets having aligned slots, said strip extending through said slots whereby contact is made with the bottom end of the bulb base mounted in each socket, the other of said strips extending between said sockets in spaced relation to said base, each end of said other strip being bent into an inverted U-shape and extending over the edge of the adjacent socket whereby the free ends of said other strip make electrical contact with the side of the bulb base mounted in each socket.

5. An illuminated display device for a motor vehicle comprising a rectangular base, means for mounting said base on a motor vehicle, spaced sockets on said base for receiving electrical bulbs, a pair of spaced conductor strips of stiff metal extending between said sockets to connect said sockets in electrical parallel, an electrical cord connection to said strips, and a translucent cover over said base, said sockets being molded integrally with said base, said base mounting comprising a pair of suction cups for removably mounting on the roof of a motor vehicle, said cord lead wire having a plug for electrical contact in the cigarette lighter socket of the vehicle, one of said strips extending along said base to said sockets, said sockets having aligned slots, said strip extending through said slots whereby contact is made with the bottom end of the bulb base mounted in each socket, the other of said strips extending between said sockets in spaced relation to said base, each end of said other strip being bent into an inverted U-shape and extending over the edge of the adjacent socket whereby the free ends of said other strip make electrical contact with the side of the bulb base mounted in each socket, said sockets having L-shaped internal grooves for forming a bayonet connection with said bulbs.

References Cited by the Examiner

UNITED STATES PATENTS

| 1,700,369 | 1/1929 | Hyatt | 339—188 X |
| 1,766,205 | 6/1930 | Ritzwoller | 339—127 X |
| 2,171,431 | 8/1939 | Kollsman. | |
| 2,738,413 | 3/1956 | Knapp | 240—7.1 |
| 2,812,423 | 11/1957 | Penna | 240—52.2 X |
| 2,905,925 | 9/1959 | Whiteneck | 240—52.2 X |
| 3,140,831 | 7/1964 | Strange | 240—8.16 |

FOREIGN PATENTS 1,128,082  8/1956  France.

NORTON ANSHER, *Primary Examiner.*